Aug. 14, 1956  J. NAAB  2,758,897
PISTON AND ROD CONNECTION
Filed Dec. 1, 1953
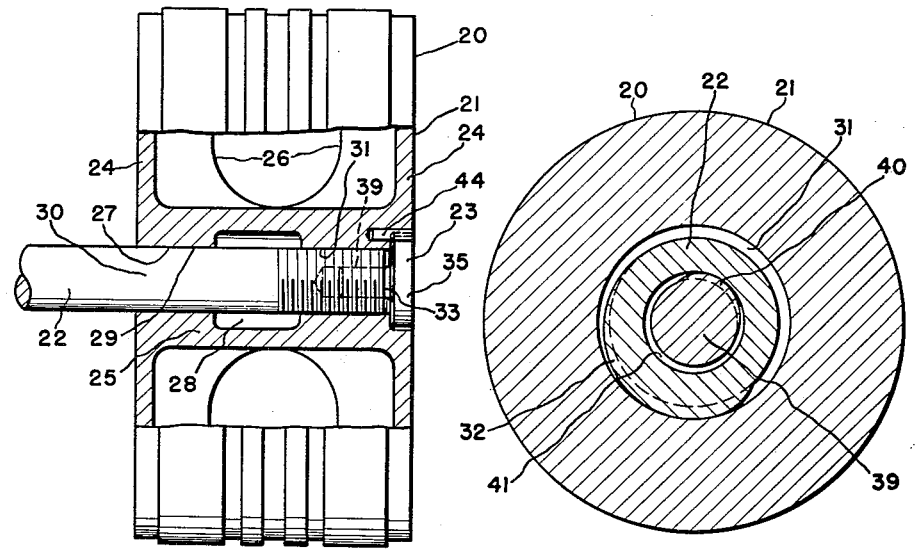
FIG. 1
FIG. 3
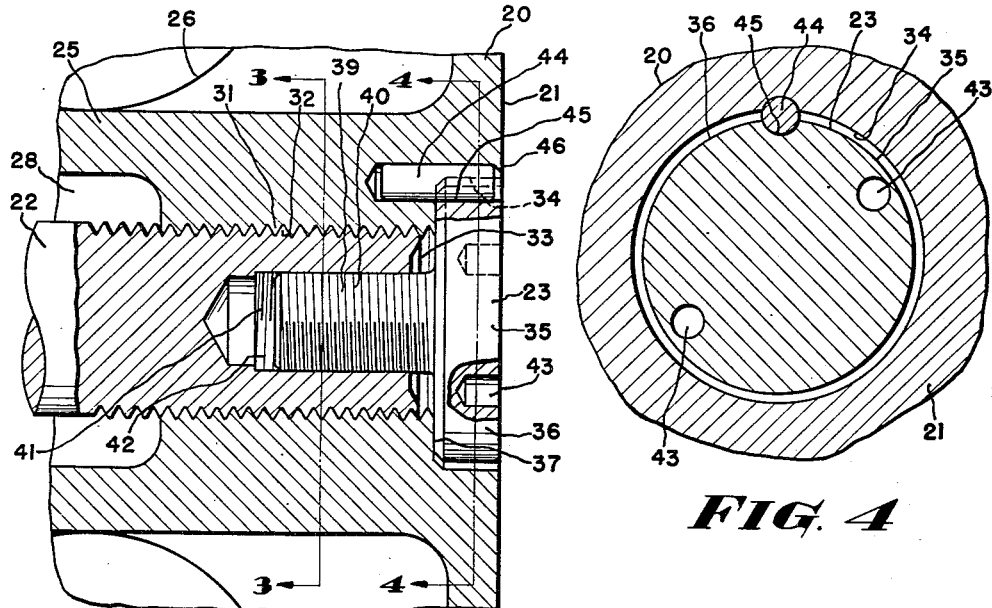
FIG. 2
FIG. 4
INVENTOR
JULIUS NAAB
BY
HIS ATTORNEY

United States Patent Office 2,758,897
Patented Aug. 14, 1956

2,758,897
PISTON AND ROD CONNECTION

Julius Naab, Easton, Pa., assignor to Ingersoll-Rand Company, New York, N. Y., a corporation of New Jersey Application December 1, 1953, Serial No. 395,421

3 Claims. (Cl. 309—17)

This invention relates to pistons, and more particularly to a connection for securing a rod to a piston.

The invention is particularly suitable for use in a piston assembly the piston and rod of which, are threadedly connected together and constructed of metals having different coefficients of expansion, as for example an aluminum piston and a steel rod.

In structures of this type, the relatively high coefficient of expansion of the piston tends to loosen the threaded connection and makes it possible for the piston to rotate upon the rod. Various expedients aimed at obviating an occurrence of this nature have been deviced heretofore as, for example, by providing the piston and the rod with cooperating tapered portions or by the use of intricate clamping devices for securing the rod to the piston, but these have been found to be unsatisfactory from a mechanical standpoint and often highly objectionable because of the high cost of production of the assembly.

It is accordingly an object of the present invention to lock the rod to the piston in a simplified and inexpensive manner and thereby obviate the need of tedious and costly construction to maintain a stable connection between the two.

A more specific object of the invention is to assure the retention of the piston in the correct assembled position upon the rod.

Other objects will be in part obvious and in part pointed out hereinafter.

In the drawings accompanying this specification and in which similar reference numerals refer to similar parts, Figure 1 is a side elevation, partly broken away, of a piston assembly constructed in accordance with the practice of the invention, Fig. 2 is a similar view, somewhat enlarged, showing the precise manner in which the various parts of the assembly are locked together, and Figs. 3 and 4 are transverse views taken through Fig. 2 on the lines 3—3 and 4—4, respectively, looking in the directions indicated by the arrows.

Referring more particularly to the drawings, 20 designates, in general, the piston assembly constructed in accordance with the practice of the invention and comprising a piston 21, a rod 22 and a locking member 23 for locking the piston 21 immovably to the rod.

The piston 21 is shown as having end heads 24 and a central hub 25 formed integrally with the heads 24 and supported by ribs 26 which radiate from the hub 25 and may extend to the cylindrical wall of the piston. The hub 25 has a bore 27 and is recessed as at 28 in the intermediate portion thereof, and the part 29 of the bore 27 lying on one side of the recess 28 is formed for intimate engagement with a corresponding portion 30 of the rod 22.

The remaining portion of the bore 27 is also of uniform diameter throughout its length and is provided with threads 31 for cooperation with corresponding threads 32 on the end portion of the rod 22. The free end 33 of the rod lies short of the end of the threaded portion of the bore 27 and in the end of the piston adjacent thereto is a recess 34 which is positioned coaxially with the bore 27 for the reception of a locking member 35 serving to hold the piston in a fixed position upon the rod 22.

The locking member 35 comprises a head 36 that seats at one end against the bottom 37 of the recess 34 and is preferably of no greater length than the depth of the recess. On the side of the head 36 confronting the rod 22 is a stem 39 having threads 40 for cooperation with the threads 41 of an aperture 42 formed axially in the end portion of the rod 22. The threads 40 of the stem 39 are of a considerably finer pitch than the threads 31 and 32 (as for example in the ratio of 2 to 1), to assure against rotational movement of the piston upon the rod.

The head 36 is of cylindrical form and is provided in its outer surface with apertures 43 for the accommodation of the prongs of a spanner wrench or other suitable tool whereby the locking member may be threaded into the rod 22.

The locking member is itself restrained against rotary movement as, for example, by a pin 44 which is embedded in the piston 21 and in engagement with a notch 45 in the periphery of the head 36. The pin 44 is retained within the piston 21 by peening some of the material of the piston over the outer end of the pin, as indicated at 46. The locking member will then be held fixedly against rotational movement and owing to the difference in the pitches of the threads on the rod and the locking member the rod will be incapable of rotating relatively to the locking member.

In assembling the device, the rod 23 is first threaded into the bore 27 to a point where its end 33 lies short of the bottom 37 of the recess 34 in order to avoid contact of the rod with the head 36 of the locking member 35. The locking member is then threaded into the rod to bring the head 36 into firm frictional engagement with the bottom surface 37 of the recess. The leading surfaces of the threads 32 are thereby drawn firmly into engagement with the opposed surfaces of the threads 31. After these parts are thus positioned, the hole in the piston which accommodates the pin 44 and the notch 45 are formed to assure true registry of the two and the pin 44 is then placed and secured in position.

As will be readily apparent from the foregoing description, by thus locking the piston to the rod and securing the locking member against movement relatively to both all the parts of the assembly will remain in the correct assembled relationship with each other irrespective of any looseness which may result, in use, by reason of expansion of the parts. It will be further noted that this result is made possible without the need of intricate and costly machining of any of the parts of the assembly.

I claim:

1. In combination, a piston having a threaded opening extending axially thereof, a rod threaded into the opening and having a threaded aperture extending endwise thereof and the threads of which are of a different pitch than the threads of the threaded opening, and a locking member having a stem threaded into the threaded aperture and having a head seated against the piston for holding the rod against rotary movement with respect to the piston, and means positively engaging the locking member against rotation relative to the piston.

2. In combination, a piston having a threaded opening extending axially thereof and a recess at one end of the opening, a rod threaded into the opening having a threaded aperture extending endwise thereof and the threads of said aperture being of the same hand and of a different pitch than the threads of the threaded opening, and a locking member threaded into the aperture and having a head to lie in the recess and seat against the piston for holding the rod against rotary movement with respect to the piston, 3. In combination, a piston having a threaded opening extending axially thereof and a recess having a seating surface coaxial with and at one end of the opening, a rod threaded into the opening to a point short of the seating surface, said rod having a threaded aperture extending endwise thereof and the threads of said aperture being of a finer pitch than the threads of the threaded opening, a locking member threaded into the aperture having a head to lie within the recess and seat against the seating surface for holding the rod against rotary movement with respect to the piston, and means in the piston interlockingly engaging the locking member for holding said locking member against rotary movement with respect to the rod.

References Cited in the file of this patent

UNITED STATES PATENTS

| | | |
|---|---|---|
| 1,222,923 | Booth | Apr. 17, 1917 |
| 1,395,814 | Gottlieb | Nov. 1, 1921 |
| 1,520,852 | Cable | Dec. 30, 1924 |
| 1,904,126 | Donaldson | Apr. 18, 1933 |
| 2,105,743 | Lee | Jan. 18, 1938 |
| 2,365,031 | Wickens | Dec. 12, 1944 |
| 2,413,347 | Hamilton et al. | Dec. 31, 1946 |
| 2,606,531 | Hedges | Aug. 12, 1952 |

FOREIGN PATENTS

| | | |
|---|---|---|
| 1,404 | Great Britain | June 10, 1914 |